2,832,718

TETRACYCLINE COMPOSITIONS CONTAINING TETRACYCLINE ORGANIC SULFONIC ACID DYE SALT AND METHODS FOR PREPARING SAME

Joseph Francis Weidenheimer and Charles Claude Reed, Pearl River, N. Y., assignors to American Cyanamid Company, New York, N. Y., a corporation of Maine No Drawing. Application January 26, 1956
Serial No. 561,677

7 Claims. (Cl. 167—65)

This invention relates to elegant pharmaceutical preparations, particularly those containing the antibiotic tetracyline.

In the pharmaceutical industry, an "elegant" preparation is one which is free of objectionable features which may lead to criticism of the product by those concerned with its use. An elegant preparation should be of good stability, color, taste, consistency, and possess other qualities which make it readily acceptable by the patient, the doctor, the druggist, the distributor, and others who must handle and use the product.

It is comparatively easy to compound antibiotics into forms of medication which may be taken orally. Some antibiotics lend themselves to satisfactory formulations without undue difficulty. Others, however, present problems which make it difficult to prepare products that are completely satisfactory to all concerned; and as a result, the use of these antibiotics tends to be discouraged. In the case of the antibiotic tetracycline, it may be made into tablets, placed in capsules and in other conventional forms of medication without particular trouble. For many uses of this antibiotic, however, it is desirable that it be compounded into syrups or drops for easy administration to patients who find it difficult or inconvenient to use the antibiotic in solid forms. When attempts are made to incorporate tetracycline as the free base in a pharmaceutical syrup or other liquid preparation, it is found that the color is unattractive and the flavor is disagreeable to some. It is, therefore, the practice in attempting to prepare a more elegant preparation to flavor the material and color it so that it will be readily accepted by children and others to whom the natural color and flavor of the tetracycline is objectionable.

It has been found unfortunately that when a simple pharmaceutical preparation of tetracycline free base and accepted food and drug flavors and colors are added to obtain the desired results, a cake tends to form which settles to the bottom of the preparation. The nature of this cake is somewhat obscure but is believed to be the result of a partial reaction between the color and the tetracycline that may be in solution. This reaction product is less soluble than the dye and an amorphous precipitate is formed which occludes particles of the tetracyline free base. The amorphous material also acts as a cement, binding the precipitated material into a cake which is not easily resuspended by simple shaking. The caked material is also of different color than the suspension. These qualities are, of course, undesirable from several points of view.

If the tetracycline is used in the form of one of its acid salts, for example tetracycline hydrochloride, the tendency to cake is eliminated but the product is unsatisfactory for other reasons. Acid salts of tetracycline are quite soluble and are also unstable in aqueous solution. At pH values about 2.5, tetracycline hydrochloride tends to hydrolyze to the free base which cakes as when using tetracycline free base. In addition to these disadvantages, preparations made from tetracycline hydrochloride have a bitter taste. For some reasons not fully understood, it is easier to obtain a substantially tasteless tetracycline free base than it is to obtain a tasteless acid salt of the antibiotic.

The difficulties of preparing an elegant tetracycline containing aqueous syrup have been overcome by the present invention in a very simple manner. We have found that acid salts of tetracycline such as tetracycline hydrochloride can be made to react with certain of the coal tar colors approved for use in foods, drugs, and cosmetics by the Food and Drug Administration. Suitable colors are usually the sodium salts of sulfonic acids. A relatively large number of such salts have been approved for use by the Food and Drug Administration and are listed in various publications including The Merck Index, Sixth Edition, pages 1112–1116. These sulfonic acid salts have one, two and three acidic groups which in the commercial products are usually reacted with sodium. These sodium salts will react with tetracycline acid salts to form products in which one, two or three mols of tetracycline are reacted as a salt with the sulfonic acid dye.

Surprisingly, these tetracycline dye salts have a brighter color, generally speaking, than the color itself. They are also more stable than the hydrochloride salt and are equally as active against bacteria as the antibiotic on a molar basis. They are more stable on standing at room temperature in aqueous solution than is the antibiotic hydrochloride and they are relatively tasteless.

Reaction products of tetracycline with sulfonic acids have been suggested and used in the precipitation of tetracycline in certain purification processes and are not new products per se insofar as the present invention is concerned. These salts are not, however, particularly suitable for the compounding of pharmaceutical preparations such as are contemplated by the present invention, because the dyes are quite costly and the color of the product would be too dark to be suitable for an elegant preparation.

The difficulties of compounding a pharmaceutically acceptable aqueous suspension of tetracycline having desirable stability, taste and color have been solved by the present invention by providing a preparation containing a small amount of the reaction product of an acid salt of tetracycline and one of the sulfonic acid dye salts approved by the Food and Drug Administration and a major proportion of tetracycline as the free base. The preparation of such product will be illustrated in examples which follow. Surprisingly, the product is stable on storage, is fully active as an antibiotic, does not tend to cake or change color on standing and is not bitter to the taste. The major proportion of antibiotic in the preparation is tetracycline free base which is relatively insoluble in aqueous suspensions and is stable. Such a material can also be made substantially tasteless. The color of the product is provided by the intensified colors of the tetracycline dye salt. Why the product does not tend to cake as do other products of a similar type which have been discussed above is most likely due to the fact that the dye has been reacted with tetracycline and there is no tendency of a reaction to occur after the preparation is compounded. Whatever the theory, the product as will be described is an elegant preparation possessing much-sought-for characteristics.

EXAMPLE I

A tetracycline containing syrup particularly suitable for oral administration to children is prepared from the following components.

Table I

|  | Percent | Per 250 Liter Batch Size |
|---|---|---|
| Tetracycline Base—Tasteless Micropulverized | 2.57 | 6,425 gm. |
| Tetracycline Hydrochloride | 0.22 | 550 gm. |
| Sucrose | 80.00 | 200,000 gm. |
| Sodium Phosphate Monobasic | 0.50 | 1,250 gm. |
| Red Dye FD & C No. 2 | 0.10 | 250 gm. |
| Methylparaben | 0.08 | 200 gm. |
| Propylparaben | 0.02 | 50 gm. |
| Cherry Flavor | 0.10 v./v. | 250 cc. |
| Alcohol, Grain | 1.06 v./v. | 265 cc. |
| Water, qs. ad | 100.00 | 250,000 cc. |

The tetracycline hydrochloride is dissolved in 33 liters of tap water. The dye dissolved in 40 liters of water is then added with stirring. Sodium phosphate and sucrose are added and heated until dissolved. The tetracycline base is added to 30 liters of water and stirred until a uniform suspension free of lumps is obtained. This suspension is added to the syrup. The methylparaben, propylparaben and the flavor are dissolved in the alcohol and added to the syrup. The volume is adjusted with water and the syrup is homogenized.

This product which has a pH of 4.0–4.1 has no bitter taste caused by the antibiotic, has a beautiful color because of the use of these proportions of the tetracycline-red dye FD&C No. 2 salt, is free from objectionable caking or color change on standing and is stable without substantial loss of antibiotic activity for more than one year.

EXAMPLE II

A tetracycline suspension which can be administered by a dropper is prepared in the following manner:

Table II

|  | Percent w./v. | Per 150 Liter Batch Size |
|---|---|---|
| Tetracycline Hydrochloride | 0.220 | 330 gm. |
| Tetracycline Base, Tasteless, Anhydrous, Micropulverized | 9.703 | 14,555 gm. |
| Methylparaben, U. S. P | 0.080 | 120 gm. |
| Propylparaben, U. S. P | 0.020 | 30 gm. |
| Cherry Flavor | 0.100 v./v. | 150 cc. |
| Span 85 | 0.150 | 225 gm. |
| Grain Alcohol, U. S. P | 0.060 v./v. | 1,590 cc. |
| Sodium Phosphate Monobasic, U. S. P | 0.500 | 750 gm. |
| Red Dye FD & C No. 2 | 0.100 | 150 gm. |
| Sucrose, U. S. P | 62.600 | 93,900 gm. |
| Water, U. S. P | 100.000 v./v. | 150,000 cc. |

To 37,800 cc. of water are added the dye, tetracycline hydrochloride, sodium phosphate and 80,925 gm. of sucrose. The syrup is heated to about 100° C. and then cooled to 38° C. 12,975 grams of sucrose are dissolved in 34,500 cc. of tap water cold and the base is added with vigorous stirring. The result, a creamy lumpfree suspension is pumped into the main batch of syrup. The methylparaben, propylparaben and flavor are dissolved in the alcohol and added to the syrup. The Span is now added. Vacuum is applied in order to remove incorporated air. The vacuum is discontinued and the syrup is made up to volume with water.

This product also possesses highly desirable characteristics.

As indicated above, any of the soluble sulfonic acid dyes approved by the Food and Drug Administration can be used in preparing the new products of the present invention. The number of mols of tetracycline may be varied according to the number of salt-forming groups contained in the dye. A number of such salts, their colors and antibiotic activity are shown in the following table.

Table III

| FD & C Dye | Antibiotic | Equivalent Neutralized | Appearance | Potency |
|---|---|---|---|---|
| Red #2 | Tetracycline | 2 | Deep cherry red | 796γ/mg. |
| Red #1 | do | 2 | Brilliant red | 724γ/mg. |
| Yellow #5 | do | 3 | Brownish-yellow | 805γ/mg. |
| Yellow #1 | do | 2 | Bright yellow powder | 814γ/mg. |
| Green #1 | do | 1 | Deep bluish-green | 308γ/mg. |
| Orange #1 | do | 1 | Deep orange powder | 430γ/mg. |
| Yellow #1 | do | 1 | Bright yellow | 727γ/mg. |
| Ext. D & C., Red #1 | do | 2 | Bright red | 698γ/mg. |

Of course, other water-soluble salts of sulfonic acid dyes may be reacted with tetracycline to produce tetracycline dye salts suitable for use in compounding aqueous suspensions of tetracycline, free base. When the preparation is to be used orally, it should be made with a sulfonic acid dye which is permitted to be used in foods, drugs, and cosmetics, referred to as FD&C colors, as shown on page 1112 of The Merck Index, Sixth Edition. Where the pharmaceutical preparation is intended for topical application, a wider range of sulfonic acid colors are available. These are referred to as Ext. D&C dyes and many are mentioned on pages 1115 and 1116 of the Sixth Edition of The Merck Index. Still other colors which may be reacted with tetracycline and used to prepare suspensions of tetracycline are referred to on pages 1113–1115 as D&C dyes.

It is a further advantage of the invention that mixed antibiotic salts of these dyes can be prepared and incorporated in pharmaceutical preparations for specific purposes. Any antibiotic having an amino salt forming group may be reacted with these dyes to provide suitable colors for use in compounding our new pharmaceutical preparations. For example, chlorotetracycline, oxytetracycline, neomycin and streptomycin may be reacted with these FD&C dyes. Further, products can be prepared which may contain, for example, one or two mols of tetracycline and one or two mols of another antibiotic having amino salt forming groups. These are useful particularly where the synergistic properties of the two antibiotics are desired.

The amount of antibiotic dye salt to be used in our preparations may vary widely from 0.1 percent to 50 percent of the total antibiotic in the preparation and even more.

These antibiotic dye salts are particularly useful in aqueous suspensions containing tetracycline which may tend to form an undesirable cake. It will be understood, of course, that a wide variety of other materials may be incorporated in the aqueous suspension in addition to the tetracycline dye salt and the tetracycline free base. These may include other antibacterial agents, antifungal agents, coloring materials, flavors, alcohols, salts, buffering agents, dispersing agents and other excipients commonly used in the preparation of pharmaceutical preparations.

What we claim is:

1. An aqueous suspension containing a major proportion of tetracycline and colored by a minor proportion of a preformed salt of tetracycline with an organic sulfonic acid dye.

2. A storage stable pharmaceutical preparation comprising tetracycline free base and a colored salt of tetracycline formed by reacting an organic sulfonic acid dye therewith prior to associating with said tetracycline free base, said tetracycline dye salt being in proportions ranging from about 0.10 percent to about 50 percent of the total antibiotic activity of the mixture, the said antibiotics being suspended in an aqueous medium.

3. A composition of matter containing tetracycline and a small amount of a color formed by the reaction of tetracycline with an organic sulfonic acid dye prior to association therewith.

4. A colored aqueous suspension containing tetracycline and a coloring agent said coloring agent consisting essentially of a salt formed by reacting an acid salt of tetracycline with the water-soluble alkali metal salt of an edible organic sulfonic acid dye, said tetracycline dye salt being in proportions ranging from about 0.10 percent to about 50 percent by weight of the tetracycline contained in said suspension.

5. A storage stable aqueous suspension comprising tetracycline and a sufficient amount of the salt formed by reacting tetracycline hydrochloride and the trisodium salt of 1-(4-sulfo-1-napthylazo)-2-napthol-3,6-disulfonic acid to give the preparation a desired red color.

6. A method of preparing a stable aqueous suspension containing tetracycline as the principal antibiotic which comprises the steps of mixing together from 1 to 3 mols of an acid salt of tetracycline with an edible alkali metal salt of an organic sulfonic acid dye to form a tetracycline dye salt and thereafter mixing said tetracycline dye salt with tetracycline free base in an aqueous suspension.

7. A process in accordance with claim 6 in which the acid salt of tetracycline is tetracycline hydrochloride and the alkali metal salt of the organic sulfonic acid is a sodium salt.

References Cited in the file of this patent
UNITED STATES PATENTS 2,649,480    Regna _____ Aug. 18, 1953

FOREIGN PATENTS 714,085    Great Britain _____ Aug. 25, 1954

OTHER REFERENCES

Antibiotics Annual, 1953–54, Proceedings of the Symposium on Antibiotics, October 28–30, 1953, Med. Encyclopedia, Inc., 1953, pp. 10–26 and 41–107.

Trafton et al.: Antibiotics and Chemotherapy, June 1954, p. 699.